United States Patent [19]

Horton

[11] 4,285,389
[45] Aug. 25, 1981

[54] THERMAL ENERGY STORAGE APPARATUS

[76] Inventor: Jack F. Horton, 4572 Via Marina #203, Marina del Rey, Calif. 90291

[21] Appl. No.: 106,770

[22] Filed: Dec. 26, 1979

[51] Int. Cl.³ ............................................. F28D 21/00
[52] U.S. Cl. ...................................... 165/1; 126/434; 126/436; 126/435; 165/85; 165/10 R; 165/104.19
[58] Field of Search .................. 165/1, 85, 104 S, 106; 126/434, 435, 436

[56] References Cited

U.S. PATENT DOCUMENTS

| | | | |
|---|---|---|---|
| 4,154,292 | 5/1979 | Herrick | 165/104 S X |
| 4,180,124 | 12/1979 | Shurcliff | 165/1 |

Primary Examiner—Albert W. Davis
Attorney, Agent, or Firm—Freilich, Hornbaker, Wasserman, Rosen & Fernandez

[57] ABSTRACT

A thermal energy storage apparatus and method in which containers holding a salt hydrate heat storage material are rotated by convection currents created in a bath liquid surrounding the containers, thereby increasing the life of the heat storage material without having to supply energy for an externally located rotating means. More specifically, an enclosure for a bath liquid is provided, the enclosure containing two vertically-extending baffles which together define a column of bath liquid in which the heat storage containers are rotatably mounted. A heat transfer means is provided at the bottom of the column between the two baffles and a heat removal means is provided at the top. As heat is transferred to the bath liquid, a convection current is created which in turn rotates the containers while heat energy is being transferred from the bath liquid to the salt hydrate material. The cooler bath liquid at the top of the enclosure flows downwardly to the bottom of the enclosure along a route defined by the baffles which is partially isolated from an upwardly flowing portion of the convection current.

21 Claims, 9 Drawing Figures

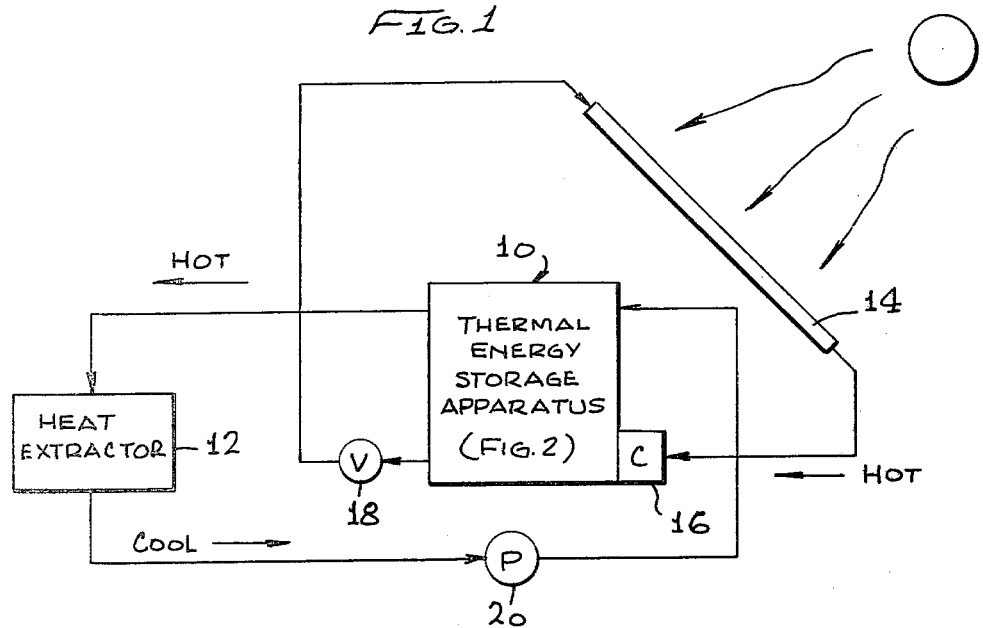
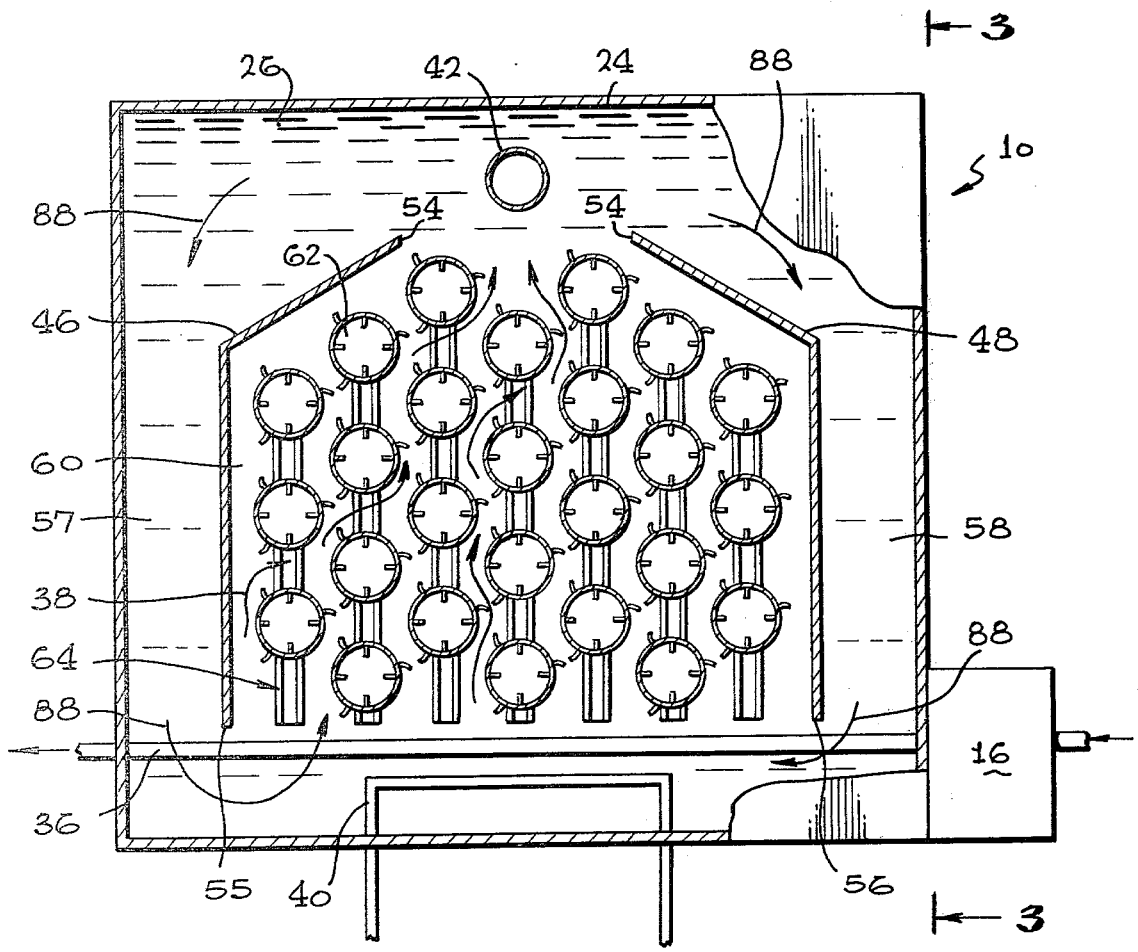

THERMAL ENERGY STORAGE APPARATUS

SUMMARY OF THE INVENTION

The invention provides a thermal energy storage apparatus in which at least one rotatably mounted container holding a heat storage material is located in a moving portion of a convection current created within a bath liquid by heat being added to the bath liquid below the container. Baffle means are provided so that upwardly and downwardly moving portions of the convection current can be partially isolated, thus minimizing interference and mixing of the two convection current portions. Means are provided for removing heat from the top of the bath liquid. Both bath liquid and heat storage material containers are chosen so that the specific gravity of the bath material is only slightly above that of the containers and their associated heat storage material. The outer surface of each container is configured so that flow of the convection current interacting with the container surface causes the container to rotate. Thus, heat current, and the other having elongated notches which provide resistance to the flowing convection current. The thermal storage apparatus provided by the invention can be used in conjunction with both heating and air conditioning systems.

FIELD OF THE INVENTION

This invention relates to energy storage systems and more particularly to methods and apparatus for storing energy in the form of heat.

BACKGROUND OF THE INVENTION

The need for an efficient thermal energy storage means in a solar energy or any other heat energy collection system in which thermal energy is to be stored and subsequently recovered for use has long been recognized. Water and stones have been used successfully but require large storage areas because of their low heat capacities. Salt hydrates because of their high heat capacity at the transition point between hydrated and unhydrated crystal states provide an excellent heat storage material. These materials efficiently absorb and release thermal energy when first used. However, after continued cycling, exothermic characteristics of a salt hydrate change due to stratification, and recrystallization is retarded. A slow rate of recrystallization through a large hydrate mass limits the rate of heat absorption between the layer closest to the heat source and inner layers. Laboratory tests have indicated that continued mixing combined with an addition of nucleating agents to promote recrystallization, solves some of these problems. Increasing the added to a heat transfer means in a lower portion of the bath liquid creates a convection current which is cooled as it flows past the heat storage material containers. At an upper level of the bath liquid, a baffle means is provided to direct the convection current into a downwardly moving portion so that movement of the convection current causes the rotatably mounted containers to continually rotate. The containers have inwardly extending protrusions which continually agitate the heat storage material contained therein as the containers rotate, thereby preventing stratification and increasing efficiency of the heat transfer process as previously explained.

In specific embodiments of the invention, the container is positioned in an upwardly moving portion of the convection current and is in the form of a longitudinally-extending tube whose outer surface is configured so that a rotating moment is applied to the container as the convection current flows. In one embodiment of the invention, the outer surface is formed in the shape of longitudinally-extending protrusions or ridges which are angled with respect to the surface of the container so that equal flow on each side of the container imparts unequal moments to the container. In another embodiment of the invention, the outer surface of the container forms longitudinally-extending grooves or notches which are also configured so that equal current flow on each side of the container imparts unequal moments to the container. Use of a thermal energy storage apparatus provided by the invention is disclosed in conjunction with both a solar collector and a thermal radiator.

In a heating or solar energy collection application, a salt hydrate having a transition point between hydrated and unhydrated crystal states of about 95° F. is used, one example of such a salt hydrate being sodium sulfate ($Na_2SO_4 \cdot 10H_2O$). The sodium sulfate and its associated container are chosen to have a specific gravity of approximately 1.2, and a heat transfer bath of anhydrous calcium chloride (CaCl 30%–70% water) is chosen to have a specific gravity of about 1.3. In a cooling application such as an air conditioning system, a thermal energy radiator is used for removing heat from the thermal energy storage apparatus at night, the heat storage material having a transition point between hydrated and unhydrated crystal states of approximately 57° F. An example of such a heat storage material would be sodium hydroxide ($NaOH \cdot 3\frac{1}{2}H_2O$). In this application, heat is removed from the top of the thermal energy storage apparatus by a thermal energy radiator, and it is added to the bottom of the thermal pile by a flowing fluid to be cooled.

BRIEF DESCRIPTION OF THE DRAWINGS

FIG. 1 is a flow diagram showing the thermal energy storage apparatus provided by the invention used in conjunction with a solar energy collector;

FIG. 2 is an elevated, partially cut-away view of the energy storage apparatus showing the heat storage material containers and baffles;

DETAILED DESCRIPTION

Figure 3:
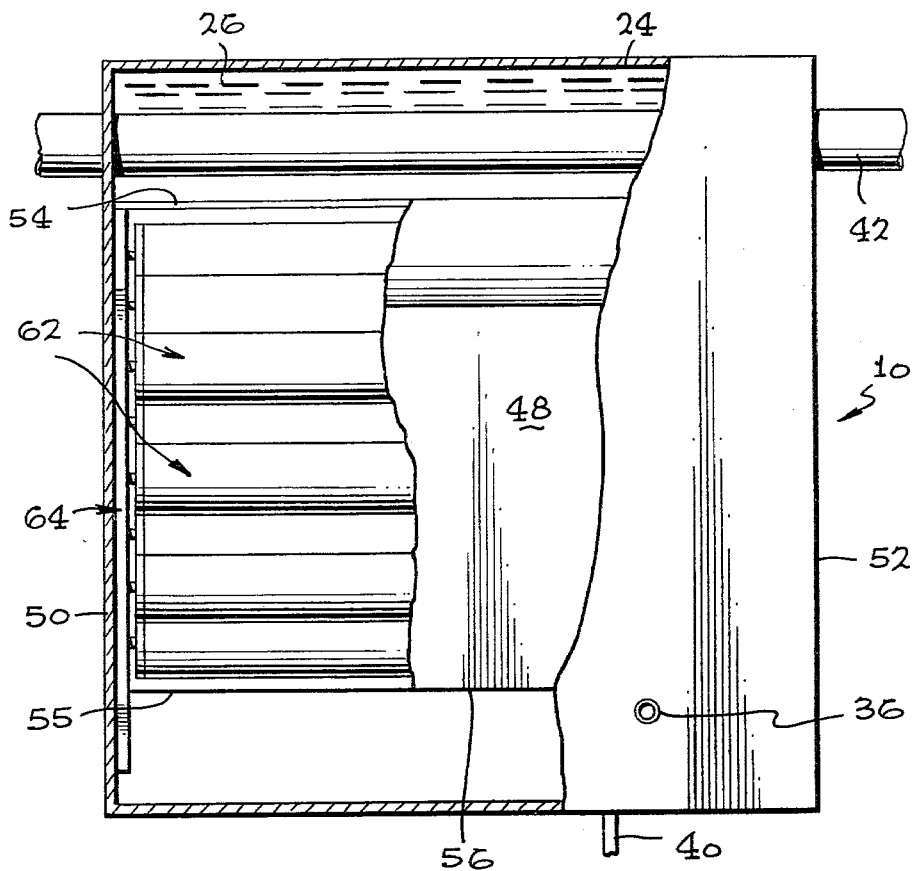
FIG. 3 is a side elevation, partially cut-away view of the thermal energy storage apparatus taken along line 3—3 of FIG. 2.

Detailed illustrative embodiments of the invention disclosed herein exemplify the invention and are currently considered to be the best embodiment for such purposes. However, it is to be recognized that other means for rotatably mounting the heat storage material containers and for rotating the containers by use of convection currents could be utilized. Accordingly, the specific embodiments disclosed are only representative in providing a basis for the claims which define the scope of the present invention.

As previously explained, the invention provides a thermal energy storage apparatus which contains one or more rotatably mounted containers holding a heat storage material such as a salt hydrate having high heat capacity at the transition point between hydrated and unhydrated crystal states. A convection current created by heat applied to a lower portion of a bath liquid in which the rotatably mounted containers are submerged is used to rotate the containers without using other externally supplied energy. As previously explained, agitation or mixing of a salt hydrate heat storage material is essential in order to maintain exothermic characteristics of the material. A baffling means is provided in the bath liquid so that upwardly moving portions of the convection current can be isolated from downwardly moving portions. In one application, the salt hydrate is chosen to have a transition point between hydrated and unhydrated crystals of a relatively high temperature such as 95° F., thereby allowing heat from a solar energy collector to be added at the bottom of the bath liquid. When needed, heat is removed at the top of the bath liquid for such purposes as space or hot water heating. In another application, the salt hydrate is chosen to have a transition point at a relatively low temperature such as 57° F., thereby allowing heat to be removed from the top of the storage apparatus at night, and to be added at the bottom of the storage apparatus during the day by a medium to be cooled, such as air being used for air conditioning purposes.

Referring now to FIG. 1, a thermal energy storage apparatus 10 is shown in conjunction with a heat extractor 12 which could be a hot water tank or a room to be heated by both latent and sensible thermal energy stored within the thermal energy storage apparatus 10. Also shown are a solar energy collector 14, a compressor 16 and a refrigerant valve 18, the combination acting as a heat pump in which the solar energy collector 14 is the evaporating side and the heat storage apparatus is the condensing side of the cycle. A suitable coolant such as freon is used as a heat transport medium. The compressor 16 liquifies freon vaporized by the solar energy collector 14 and pumps both sensible and latent heat into the thermal energy storage apparatus 10. The cooled freon is then returned through the refrigerant valve 18 to the solar energy collector 14 to repeat the cycle. The thermal energy storage apparatus 10 of the present invention is not limited, however, to use in conjunction with a solar energy collector, and can be used to store thermal energy provided by a variety of sources such as electrical energy from a solar panel array or steam energy from an underground heat source. Heat is removed from the thermal energy storage apparatus 10 by flowing a medium to be heated, such as air or water, through an upper portion of the thermal energy storage apparatus 10. The medium is circulated by a pump 20.

Referring now to FIGS. 2 and 3, the structure of the energy storage apparatus 10 provided by the invention can be seen. A container or enclosure 24 for a bath liquid 26 is provided. As one can appreciate, it is important that the bath liquid 26 be insulated from the ambient environment as much as possible consistent with weight and cost constraints. A possible construction for the bath liquid container 24 could utilize six sandwich panels, one for each side and one for the top and bottom of the container 24. These panels could be formed of aluminum having a core material of phenolic impregnated kraft paper (honeycomb). Such a material would serve a dual purpose, that is, provide the flexural strength to support the bath liquid 26 and also provide sufficient insulation to minimize heat losses. A six-sided angle-iron, open-box frame could be fitted "aquarium style" with five of the sandwich panels, the weight of the bath liquid being used to seal the edges of the panels against a gasket or high-density mastic compound along the flat sides of the angle iron. The sixth sandwich panel could be bolted to the top of the container utilizing a conventional gasket. However, many other types of insulating enclosures could also be utilized.

A heat transfer duct 36 formed of a heat-conductive material such as copper is provided in the lower portion of the bath liquid 26. Compressed hot coolant from the compressor 16 flowing through the heat transfer duct 36 is cooled by the bath liquid 26, thereby heating the bath liquid 26 and initiating an upwardly flowing convection current as shown by the arrows at 38. Although in this embodiment, a heat transfer duct 36 is shown as a straight pipe extending through the bottom of the bath liquid 26, other configurations could be used such as a coiled duct or a zig-zagged duct. The purpose of the heat transfer duct 36 is to transfer as much as possible of the heat energy contained in the compressed coolant to the bath liquid 26. In the event that insufficient heat is supplied by the solar energy collector 14, heat energy from an auxiliary electrical heating element 40 can be provided. A heat removal duct 42 formed of a highly conductive material is provided at the top of the bath liquid 26. This duct could carry any fluid to be heated such as air or water. Two longitudinally-extending baffles comprising a first baffle 46 and a second baffle 48 are provided. These baffles 46 and 48 extend the entire length of the enclosure 24, as shown in FIG. 3, and are attached along their side edges to a front side 50 and back side 52 of the enclosure 24. The upper portions of the baffles are formed so that they extend inwardly towards the center of the enclosure so that their upper edges create a longitudinally-extending gap or convection current exit aperture as shown at 54. The gap 54 is positioned directly below the heat removal duct 42. It is preferable that the baffles be formed of a material having low thermal conductivity so that the bath liquid 26 separated thereby will be thermally isolated. The lower edges 55 and 56 of the baffles 46 and 48, respectively, are spaced apart from the bottom of the enclosure 24 so that the bath liquid 26 can pass from side columns 57 and 58 into a central column 60, the three columns 57, 58 and 60 being defined by the first and second baffles 46 and 48. A plurality of longitudinally-extending tubes or containers 62 for holding a heat storage material are rotatably mounted to the front and back sides 50 and 52 of the enclosure tank 24. The outer surfaces of the tubes 62 are formed so that a convection current in the central column 60 will cause them to rotate. The tubes 62 are rotatably mounted along vertically extending mounting tracks 64 as will be explained below. They can be mounted in a variety of configurations with respect to the central column 60. In the configuration shown, the tubes 62 fill approximately 75% of the volume of the central column 60. By matching the density of the bath liquid 26 to the density of the storage tubes 62 and the heat storage material contained therein, a "floating log" condition can be provided. This condition allows the tubes 62 to rotate with a small amount of convection current flow because they are essentially in a weightless state. Although the tubes 62 are shown mounted in the central column 60, they could also be mounted in side columns 57 and 58.

Figure 4:
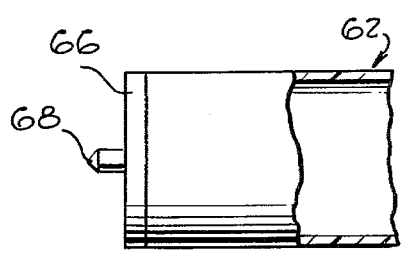
FIG. 4 is a side elevation view of one end of the heat storage material container.
Figure 5:
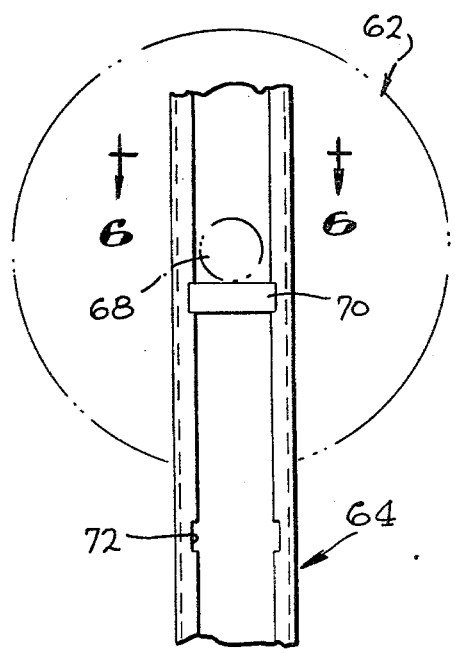
FIG. 5 is a front elevation view of a track and plug used to position a heat storage material container.
Figure 6:
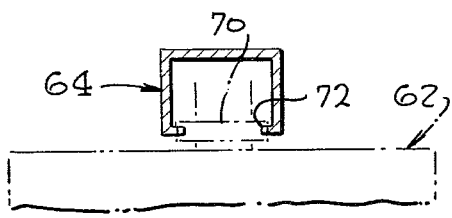
FIG. 6 is a cross-sectional view taken along line 6—6 of FIG. 5.

Referring to FIG. 4, each storage tube 62 is constructed of a thin wall of extruded plastic material. This thin wall can define different types of outer surface configurations, as will be explained below, in order to effect rotation by the upwardly moving convection current. Each tube 62 is fitted at each end with an end cap 66 having a pointed extrusion 68 extending from its center. One of the vertically-extending mounting tracks 64 is shown in FIG. 5, a cross-section of which is shown in FIG. 6. Vertical positioning slugs 70 are anchored by short, vertically-extending positioning slits 72 positioned along the mounting tracks 64, each slug 70 providing a base upon which one of the pointed extrusions 68 can rest.

Figure 7:
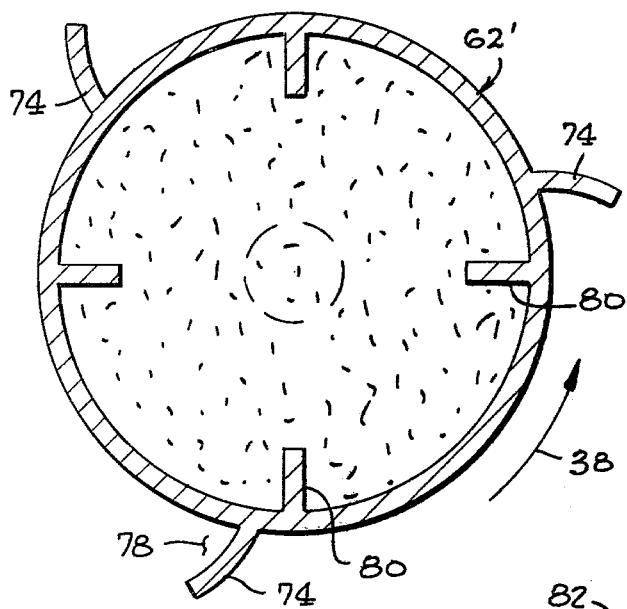
FIG. 7 is a cross-sectional view showing a first embodiment of the heat storage material container.

As previously explained, different outer surface configurations for the storage tubes 62 can be provided. In one configuration of the storage tube 62', as can be seen by referring to FIG. 7, three longitudinally extending turning fins 74 are positioned at 120 degree increments around the surface of the tube 62'. These fins 74 extend the length of the storage tube 62', thereby increasing the surface area exposed to the convection current 38 and resisting buckling stresses caused when handling the storage tubes 62' outside the container. The turning fins 74 are angled inwardly towards the surface of the tube 62' so that the convection current will impart a different turning moment on each side of the tube 62'. In the configuration shown, the convection current catches an inside volume 78 formed by the turning fin 74, thereby causing the storage tube 62' to rotate in a counter-clockwise direction. Inwardly protruding mixing fins 80 are provided to continually agitate and mix the salt hydrate heat storage material contained within the storage tube 62', thereby increasing the rate of heat transfer and preventing stratification as previously explained.

Figure 8:
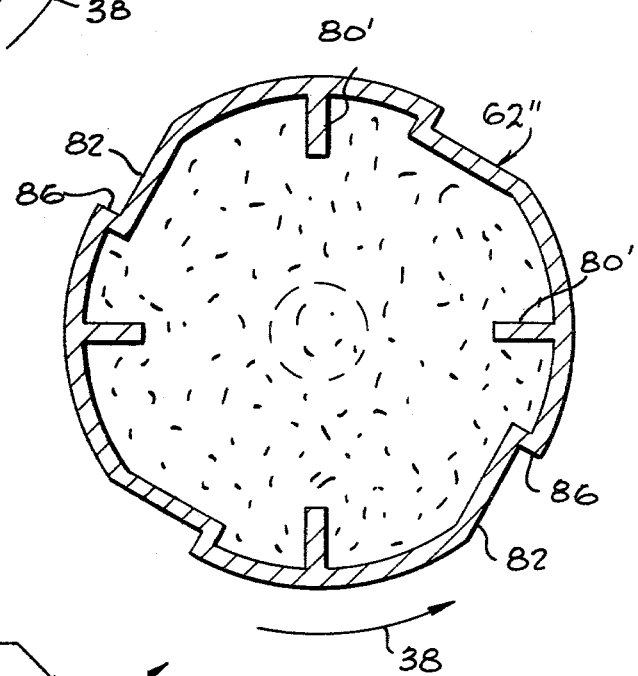
FIG. 8 is a cross-sectional view of a further embodiment of the heat storage material container.

In a second embodiment of the storage tube 62" shown in FIG. 8, a plurality of longitudinally extending notches or grooves 82 are provided in the outside surface of the storage tube 62". The upwardly flowing convection current 38 impinges against a radially formed face 86, thereby creating a rotation moment which causes the storage tube 62" to rotate in a counter-clockwise direction. As with the first storage tube 62', four inwardly protruding mixing fins 80' are provided to continually agitate and mix the salt hydrate contained therein as the storage tube 62" rotates. As one can appreciate, the above examples are only illustrative of the general type of storage tube 62 provided by the invention. Other configurations could be utilized. For example, the storage tubes could be rotatably mounted so that the pointed extrusions 68 extend through the first and second baffles 46 and 48. Turning fins could then be attached to portions of the protrusions extending through the baffles, thereby providing a means whereby the tubes 62 could be rotated by the downwardly flowing portion of the convection current.

In a specific application where thermal energy stored within the thermal energy storage apparatus 10 is to be used for heating purposes, the bath liquid 26 can comprise anhydrous $CaCl_2$ which is mixed with an appropriate amount of water to provide a specific gravity of 1.3. The tubes 62 are formed of a fairly light plastic material, and filled with a heat storage material comprising sodium sulfate ($Na_2SO_4.10H_2O$) having a transition temperature of approximately 95° F., each tube and its associated heat storage material having a specific gravity of approximately 1.2, or slightly less than that of the bath liquid 26. As heat is added to the bath liquid 26 directly below the central column 60, as shown in FIG. 2, an upwardly moving convection current 38 created by the thus heated bath liquid 26 causes the tubes 62 to continually rotate, thereby agitating and mixing the heat storage material contained within the tubes 62. The heat storage material absorbs heat from the upwardly rising convection current 38 in the form of sensible heat and latent heat. When the upwardly moving convection current 38 passes through the convection current exit aperture 54, it is isolated by the first and second baffles 46 and 48, respectively from the bath liquid portion surrounding the tubes 62. The convection current then flows downwardly to the bottom of the enclosure 24 as shown by the arrows at 88. The thus-cooled bath liquid is then reheated and begins to rise again, thereby repeating the cycle. As long as the temperature of the bath liquid within the convection current exit aperture 54 is cooler than the bath liquid surrounding the tubes 62, convection currents as shown by 38 and 88 will continue to flow. Heat is extracted from the thermal energy storage apparatus 10 by flowing a fluid to be heated, such as air or water, through the heat removal duct 42. As the fluid to be heated passes through the heat removal duct 42, it absorbs heat from the surrounding bath liquid 26, thereby creating a convection current which flows upwardly around the tubes 62. Again, as heat is removed from the heat storage material, the tubes 62 are rotated by the convection current, thereby continually agitating and mixing the heat storage material contained therein. Thus, both sensible heat and latent heat storage within the bath liquid 26 and heat storage material are removed from the thermal energy storage apparatus. Another heat storage material which could be utilized is sodium acetate ($NaC_2H_3O_2.3H_2O$) having a transition temperature of approximately 135° F.

Figure 9:
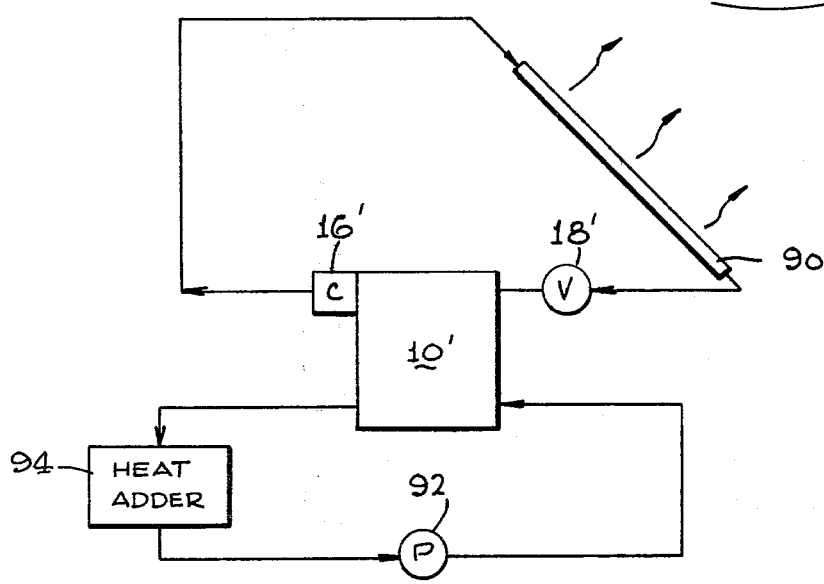
FIG. 9 is a flow diagram showing the thermal energy storage apparatus provided by the invention used in conjunction with a thermal energy radiator.

In another application, the thermal energy storage apparatus provided by the invention can be utilized in conjunction with an air conditioning system. Here, a salt hydrate whose transition point is approximately 57° F. is utilized as the heat storage material, thereby storing "cold" at night for use during the day. An example of a salt hydrate having a 57° F. transition point is sodium hydroxide ($NaOH.3\frac{1}{2}H_2O$). Referring to FIG. 9, an air conditioning system comprising a thermal energy storage apparatus 10' provided by the invention, a compressor 16', a refrigerant valve 18', and a thermal energy radiator 90 are shown. Here the compressor 16' compresses a coolant fluid which is provided to the thermal energy radiator 90 which in turn cools the coolant fluid through radiation of latent and sensible heat contained therein. The thus-cooled coolant fluid passes through the refrigerant valve 18' into the thermal energy storage apparatus 10', thereby cooling the top portion of the bath liquid 26. This cooled bath liquid above the convection current exit aperture 54 causes a convection current to flow, the flow being maintained so long as the top portion of the bath liquid 26 remains cooler than the bottom portion. As in the previous application, the convection current causes the tubes 62 to continually rotate, thereby agitating and mixing the salt hydrate heat storage material contained therein. During the day, "cold" is removed from the thermal energy storage apparatus 10' by pumping a fluid through the heat transfer duct 36 in the bottom portion of the bath enclosure 24 by use of a pump 92. As heat is removed from the fluid being pumped, heat is added to the bath liquid 26 surrounding the heat transfer duct 36, thereby creating a upwardly moving convection current in the central column 60. As the bath liquid 26 flows around the tube 62, it is cooled. A heat adder 94 is shown which could be either a room to be air conditioned or water to be cooled.

It should now be apparent that a thermal energy storage apparatus has been described in which tubes containing a heat storage material, such as a salt hydrate, are rotated by convection currents in a bath liquid created as a result of a heat transfer process. The heat storage material can be chosen to have a relatively high or low transition point depending on whether the thermal energy storage devise is to be used as part of a heating or cooling system. The life of a salt hydrate heat storage material is extended as a result of continual agitation and mixing during the heat transfer process, this agitation and mixing being accomplished entirely by convection currents formed within the bath liquid.

What is claimed is:

1. A thermal energy storage apparatus comprising:
   a bath liquid;
   one or more containers holding a heat storage material, said containers being submerged in said bath liquid
   means for transferring heat to a lower portion of said bath liquid thereby creating a convection current having upwardly flowing and downwardly flowing portions;
   means for rotatably mounting said one or more containers so that said containers are located in said convection current flowing portion;
   means for isolating said convection current upwardly flowing portion from said convection current downward flowing portion; and
   means for rotating said at least one heat storage container by said convection current.

2. The energy storage apparatus of claim 1 further comprising means for removing heat from said thermal storage apparatus.

3. The energy storage apparatus of claim 2 wherein said one or more containers comprise a plurality of containers, each of which comprises an elongated cylinder, the inner surface of which forms a plurality of protrusions for agitating said heat storage material contained therein as said cylinders rotate.

4. The energy storage apparatus of claim 3 wherein said means for isolating comprises a baffle means defining vertically extending columns within said bath liquid, at least one of said columns containing said plurality of rotatably mounted elongated cylinders.

5. The energy storage apparatus of claim 4 wherein said bath liquid is contained in an enclosure having first and second side pairs and a top and bottom, said baffle means comprising:
   a first vertically-extending baffle spaced between the center and one side of said first side pair so that its bottom edge is spaced apart from said enclosure bottom, said first baffle having an upper section extending inwardly towards the other side of said first side pair; and
   a second vertically-extending baffle spaced between the center and the other side of said first side pair so that its bottom edge is spaced apart from said enclosure bottom, said second baffle having an upper section extending inwardly towards the one side of said first side pair, the upper edges of said first and second baffle upper sections defining an exit aperture for said upwardly flowing convection current, the vertically extending column between said first and second baffles comprising said column containing said plurality of rotatably mounted cylinders.

6. The energy storage apparatus of claim 5 wherein said means for removing heat is positioned above said exit aperture.

7. The energy storage apparatus of claim 3 wherein said means for rotating comprises elongated protrusions formed along the outer surface of said cylinders whereby the force of said flowing convection current against said elongated protrusions causes said cylinders to rotate.

8. The energy storage apparatus of claim 7 wherein said cylinders are located in said convection current upwardly flowing portion.

9. The energy storage apparatus of claim 3 wherein said means for rotating comprises elongated notches formed along the surface of said cylinders.

10. The thermal energy storage apparatus of claim 1 wherein the weight of said bath liquid displaced by said one or more containers is substantially equal to the weight of said one or more containers and their associated heat storage material.

11. The energy storage apparatus of claim 1 wherein said bath liquid comprises approximately 70 percent water and 30 percent anhydrous $CaCl_2$.

12. The energy storage apparatus of claim 1 wherein said heat storage material comprises sodium sulfate ($Na_2SO_4.10H_2O$).

13. A thermal storage apparatus comprising:
    an enclosure holding a bath liquid;
    a heat source in heat transfer relationship to a lower portion of said bath liquid;
    rotatably mounted containers holding a heat storage material, said containers being located in an upwardly moving portion of a convection current created by said heat source in said bath liquid;
    baffle means isolating said upwardly moving portion of said convection current from a downwardly moving portion of said convection current; and
    means for rotating said containers by movement of said convection current.

14. The apparatus of claim 13 further comprising a heat removal means in heat transfer relationship to an upper portion of said bath liquid.

15. The apparatus of claim 14 wherein said heat removal means comprises ducting through which a medium to be heated is flowing.

16. The apparatus of claim 14 wherein said bath liquid comprises approximately 70 percent water and 30 percent anhydrous calcium chloride ($CaCl_2$) and said heat storage material comprises sodium sulfate ($Na_2SO_4.10H_2O$).

17. The apparatus of claim 14 wherein said bath liquid comprises approximately 70 percent water and 30 percent anhydrous calcium chloride ($CaCl_2$) and said heat storage material comprises sodium acetate ($NaC_2H_3O_2.3H_2O$).

18. The apparatus of claim 14 wherein said heat source comprises ducting through which a medium to be cooled is flowing, and said heat removal means comprises ducting through which a medium to be heated is flowing, said medium to be heated being colder than said medium to be cooled.

19. The apparatus of claim 18 wherein said bath liquid comprises approximately 70 percent water and 30 percent anhydrous $CaCl_2$ and said heat storage material comprises sodium hydroxide ($NaOH \cdot 3\frac{1}{2}H_2O$).

20. A method of storing thermal energy comprising the steps of:

heating a lower portion of a bath liquid thereby creating a convection current in said bath liquid;

rotatably mounting one or more containers holding a heat storage material in a portion of said convection current;

rotating said containers by said convection current; and isolating said rotatably mounted containers from a downwardly moving portion of said convection current.

21. The method of claim 20 further comprising the step of removing heat from an upper portion of said bath liquid.

* * * * *